United States Patent
Haneji et al.

[11] Patent Number: 6,167,003
[45] Date of Patent: Dec. 26, 2000

[54] OPTICAL DISC APPARATUS FOR INSTALLING TWO TYPES OF OPTICAL DISCS

[75] Inventors: Yasuo Haneji, Yokosuka; Akira Yoshida, Fujisawa; Yasuhiro Mori; Yasuhiro Yamaguchi, both of Yokohama, all of Japan

[73] Assignee: Victor Company of Japan, Ltd., Yokohama, Japan

[21] Appl. No.: 09/064,318

[22] Filed: Apr. 23, 1998

[30] Foreign Application Priority Data

Apr. 23, 1997 [JP] Japan ................................. 9-120190

[51] Int. Cl.$^7$ .................................................. G11B 7/085
[52] U.S. Cl. ......................... 369/44.23; 369/112; 369/54
[58] Field of Search .............................. 369/44.23, 44.14, 369/58, 112, 94

[56] References Cited

U.S. PATENT DOCUMENTS

| | | | |
|---|---|---|---|
| 5,687,154 | 11/1997 | Tsuchiya et al. | 369/112 |
| 5,729,510 | 3/1998 | Kasahara et al. | 369/44.14 |
| 5,777,959 | 7/1998 | Nakagawa et al. | 369/44.14 |
| 5,898,653 | 4/1999 | Yoshizawa | 369/44.23 |
| 5,986,984 | 11/1999 | Nakamura et al. | 369/44.23 |

FOREIGN PATENT DOCUMENTS

| | | |
|---|---|---|
| 0727776 | 8/1996 | European Pat. Off. . |
| 0838810 | 4/1998 | European Pat. Off. . |
| 05298731 | 11/1993 | Japan . |
| 08315408 | 11/1996 | Japan . |
| 8-329517 | 12/1996 | Japan . |
| 9-73646 | 3/1997 | Japan . |
| WO97/42632 | 11/1997 | WIPO . |
| WO98/02874 | 1/1998 | WIPO . |

OTHER PUBLICATIONS

Patent Abstracts of Japan, vol. 97, No. 4, Apr. 30, 1997 & JP 08 329517 A (Sanyo Electric Co Ltd), Dec. 13, 1996.

*Primary Examiner*—Aristotelis M. Psitos
*Attorney, Agent, or Firm*—Jacobson, Price, Holman & Stern, PLLC

[57] ABSTRACT

An optical disc apparatus has a first objective lens for a first optical disc such as a CD and a second objective lens for a second optical disc such as a DVD. The first and second objective lenses are mounted on a base that is transferrable in a direction of radii of the first and second optical discs coaxially installed in the optical disc apparatus. A first center of the first objective lens is located on a first line passing through a center of the first optical disc. On the other hand, a second center of the second objective lens is located on a second line orthogonal to the first line. The first and centers are separated from each other by a predetermined distance.

6 Claims, 12 Drawing Sheets

OPTICAL DISC APPARATUS FOR INSTALLING TWO TYPES OF OPTICAL DISCS

BACKGROUND OF THE INVENTION

The present invention relates an optical disc apparatus with a plurality of objective lenses for recording and reproducing data to and from optical discs of different types installed therein.

An optical disc apparatus has an optical pickup on which objective lenses for optical discs of different types are mounted.

The optical disc apparatus transfers a spindle motor by a rack and pinion mechanism or a solenoid to transfer an objective lens for a compact disc (CD)-ROM along the line between centers of CD-ROM and the objective lens and also another objective lens for a digital video disc (DVD) along the line between centers of DVD and the objective lens.

There is a demand for higher rotation of a disc to raise a data transfer rate in this kind of optical disc apparatus.

However, the spindle motor would become a source of vibration if rotated at a high speed. And such a transferrable spindle motor has a limited stiffness when installed in the optical disc apparatus, and would generate a gyro effect and vibration to an optical pickup, which are harmful to tracking and focussing control.

Further, such a transferrable spindle motor requires a complicated mechanism such as a motor, a rack and a pinion or a solenoid. This results in a high cost and a difficulty in compactness.

The optical disc apparatus with the transferrable spindle motor has further difficulty in maintaining orthogonal relationship between the optical axes of the objective lenses and the CD-ROM and DVD.

Particularly, if a deformed disc is installed, a complicated adjustment is required. For example, if a bowl or cone like DVD is installed, deviation adjustment is required after the spindle motor is transferred to a position corresponding to the objective lens for DVDs. This results in delay in recording and reproduction.

SUMMARY OF THE INVENTION

A purpose of the present invention is to provide an optical disc apparatus capable of recording and reproducing data to and from optical discs of different types without transferring a rotary center of the optical discs.

The present invention provides an optical disc apparatus comprising: a first objective lens for a first optical disc; a second objective lens for a second optical disc of a type different from the first optical disc; and a base on which the first and second objective lenses are mounted, the base being transferrable in a direction of radii of the first and second optical discs coaxially installed in the optical disc apparatus, wherein a first center of the first objective lens is located on a first line passing through a center of the first optical disc, a second center of the second objective lens is located on a second line almost orthogonal to the first line and the first and centers are separated from each other by a predetermined distance.

BRIEF DESCRIPTION OF PREFERRED EMBODIMENTS

DETAILED DESCRIPTION OF PREFERRED EMBODIMENTS

Preferred embodiments according to the present invention will be described with reference to the attached drawings.

Figure 1:
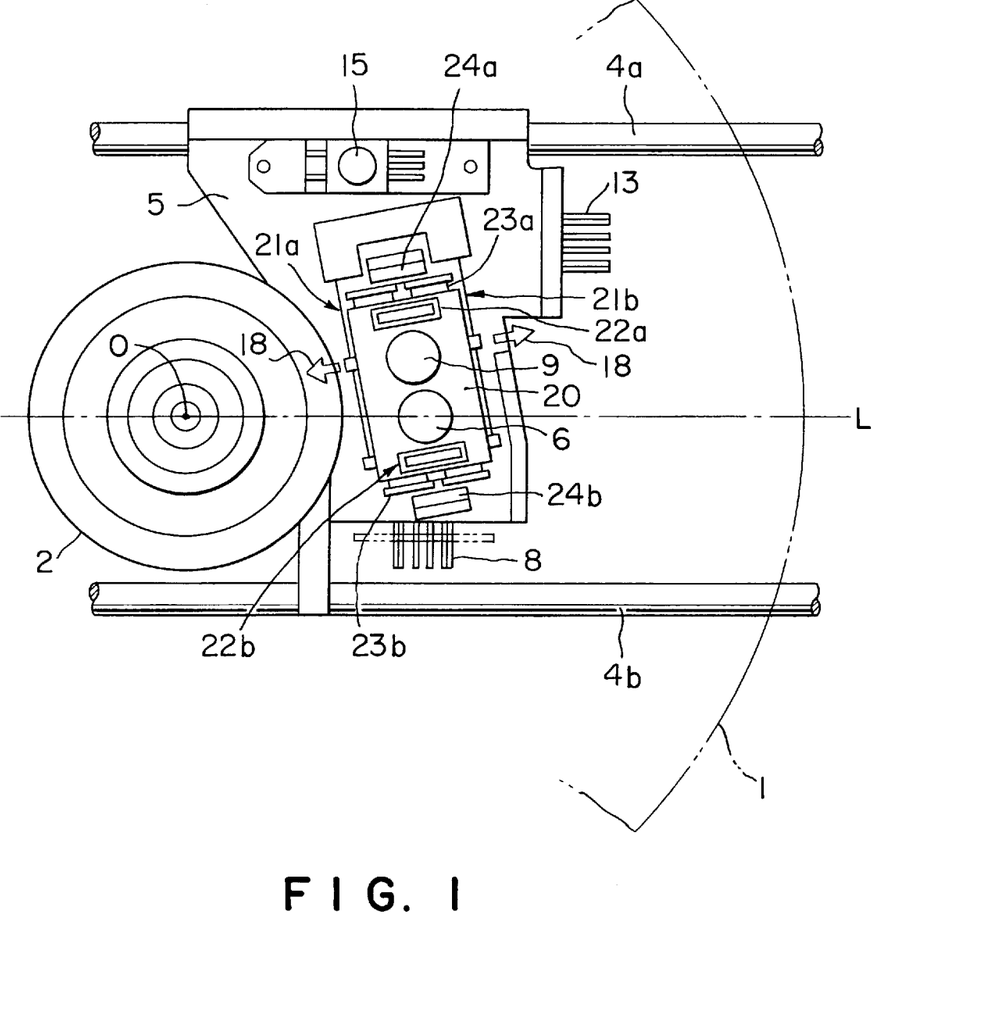
FIG. 1 is a plane view of an optical disc apparatus according to the present invention.

An optical disc 1, such as a CD and a DVD of diameter 120 mm, is placed on a turn table 2 as shown in FIG. 1. The optical disc 1 is rotated by a spindle motor 3 provided as coaxial with the turn table 2 as shown in FIG. 2.

On both sides of the turn table 2, parallel guide shafts 4a and 4b are arranged on a plane substantially horizontal to the disc surface and vertical to a rotary axis of the spindle motor 3.

Figure 2:
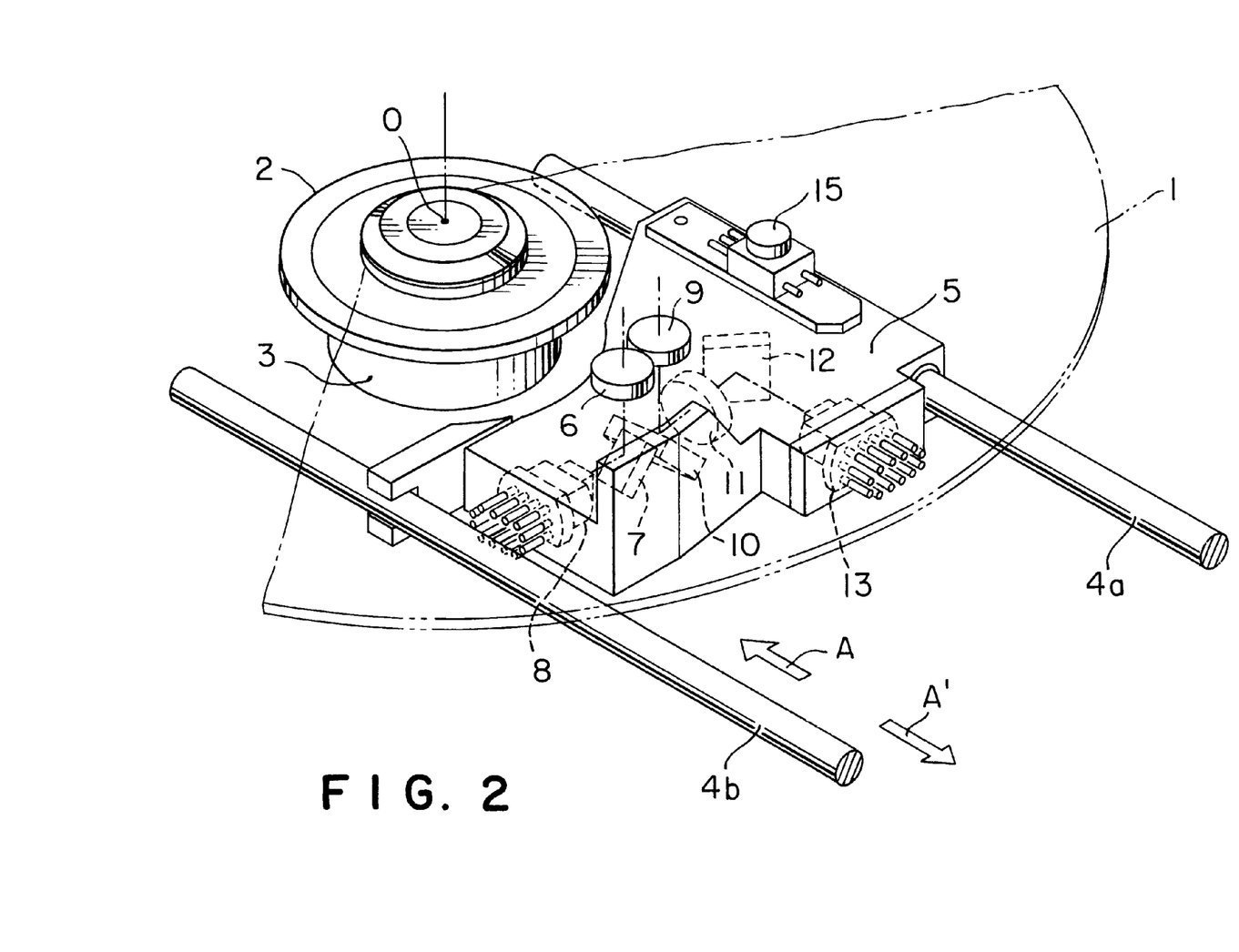
FIG. 2 is a perspective view of the optical disc apparatus shown in FIG. 1.

A pickup base 5 is provided as linearly movable along the guide shafts 4a and 4b in directions indicated by arrows A and A' in FIG. 2.

Provided on the pickup base 5 is a first optical system for CDs that includes a first objective lens 6, a mirror 7 for changing a direction of a laser beam to a vertical direction with respect to the disc surface and a first integrated laser resonating and detecting device 8.

Figure 3:
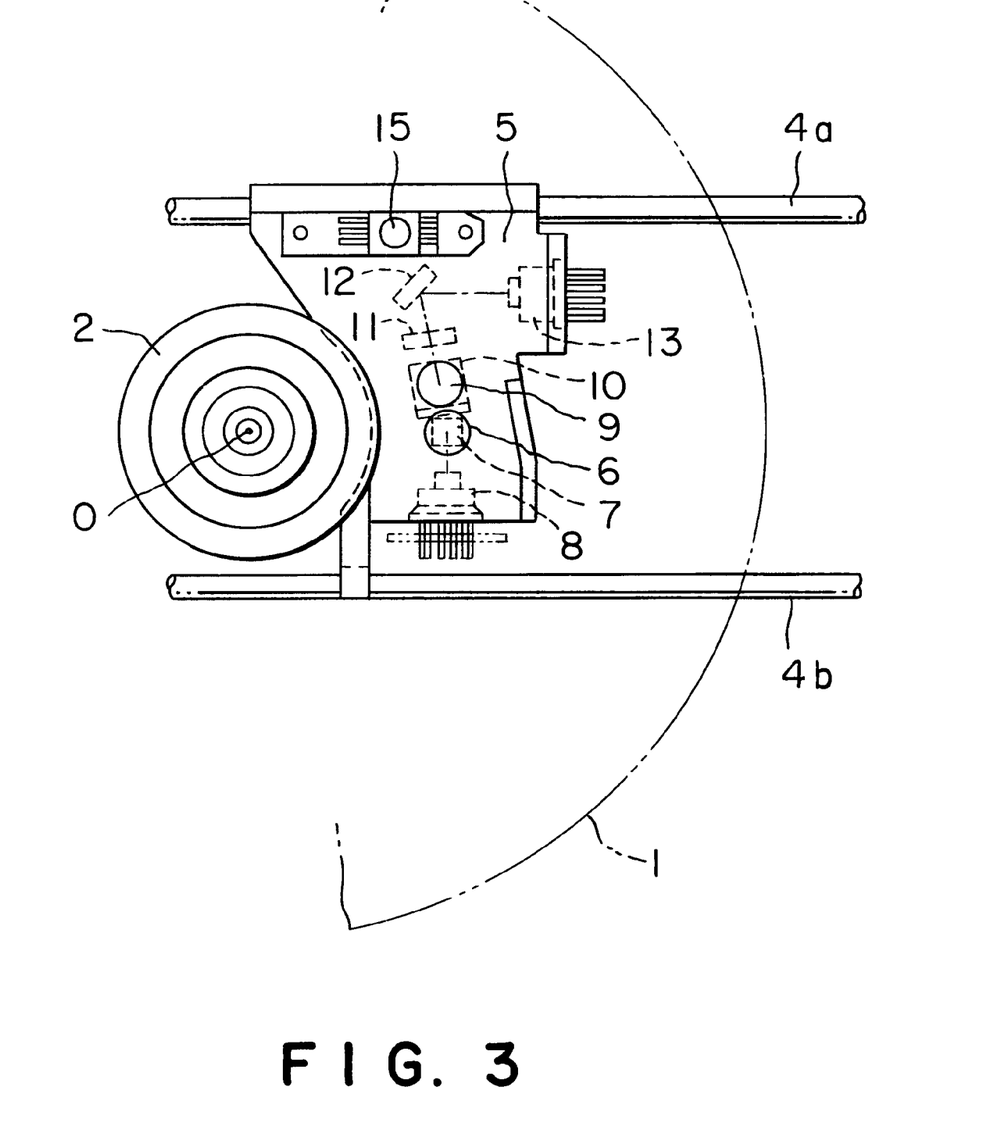
FIG. 3 is a plane view of an optical system of the optical disc apparatus shown in FIG. 1.

As shown in FIGS. 2 and 3, the laser resonating and detecting device 8 emits a laser beam in a direction horizontal-to the disc surface. The laser beam is then changed in direction by the mirror 7 to a vertical direction with respect to the disc surface.

The laser beam in the vertical direction is coaxial with the objective lens 6 so that it is focused on the optical disc 1 via the objective lens 6. The laser beam is then reflected from the optical disc 1 and enters the laser resonating and detecting device 8 via the objective lens 6 and mirror 7.

Further, provided on the pickup base 5 is a second optical system for DVDs that includes a second objective lens 9, a mirror 10 for changing a direction of a laser beam to a vertical direction with resect to the disc surface, a reflecting mirror 12 and a second integrated laser resonating and detecting device 13.

Figure 4:
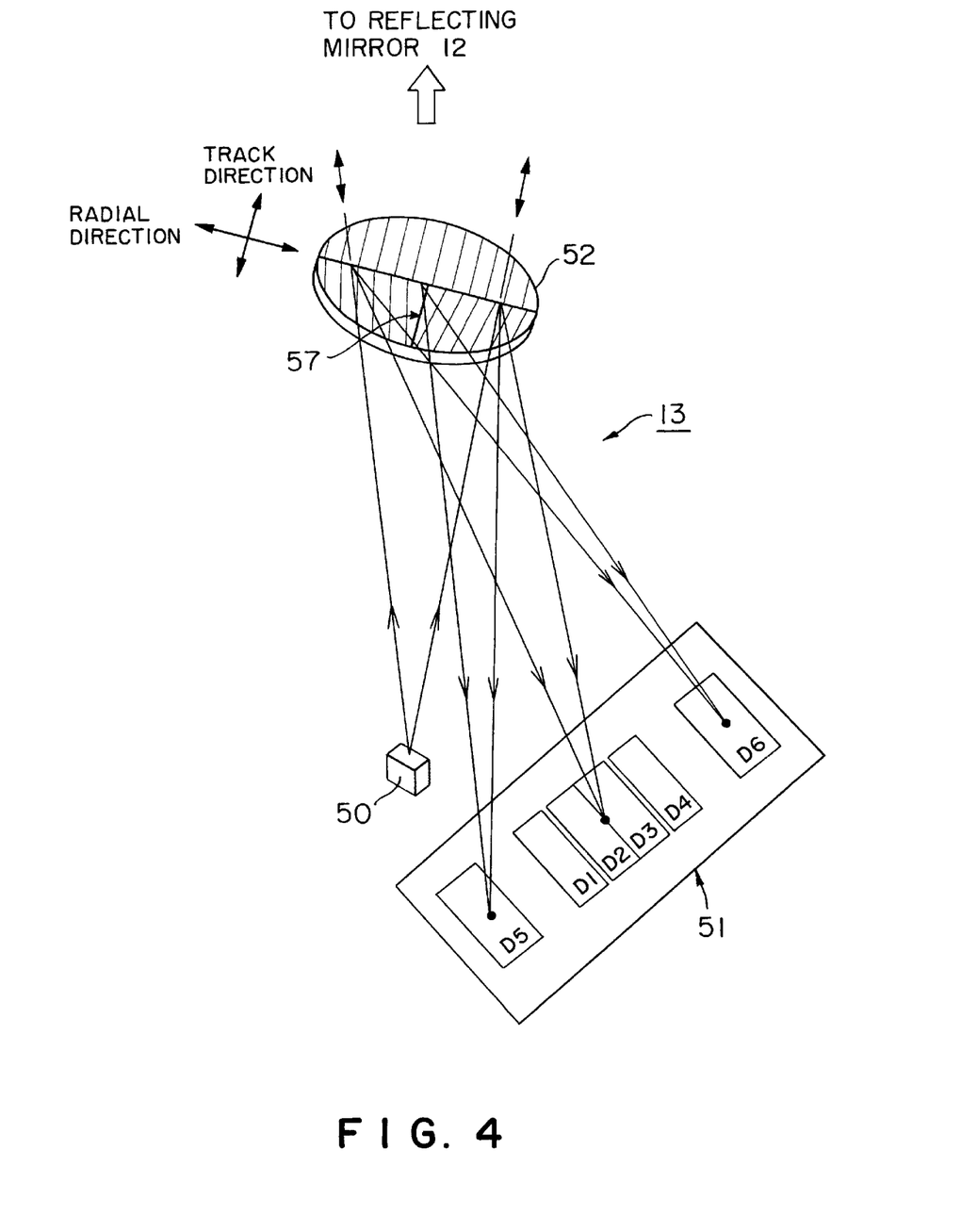
FIG. 4 illustrates a structure of an integrated laser resonating and detecting device.

The laser resonating and detecting device 13 includes, as shown in FIG. 4, a laser source 50, a photodetector 51 for detecting a reflected laser beam and a holographic device 52 that allows a laser beam emitted by the laser source 50 to pass therethrough to the reflecting mirror 12 and a reflected laser beam from the reflecting mirror 12 to pass therethrough to the photodetector 51.

Figure 5:
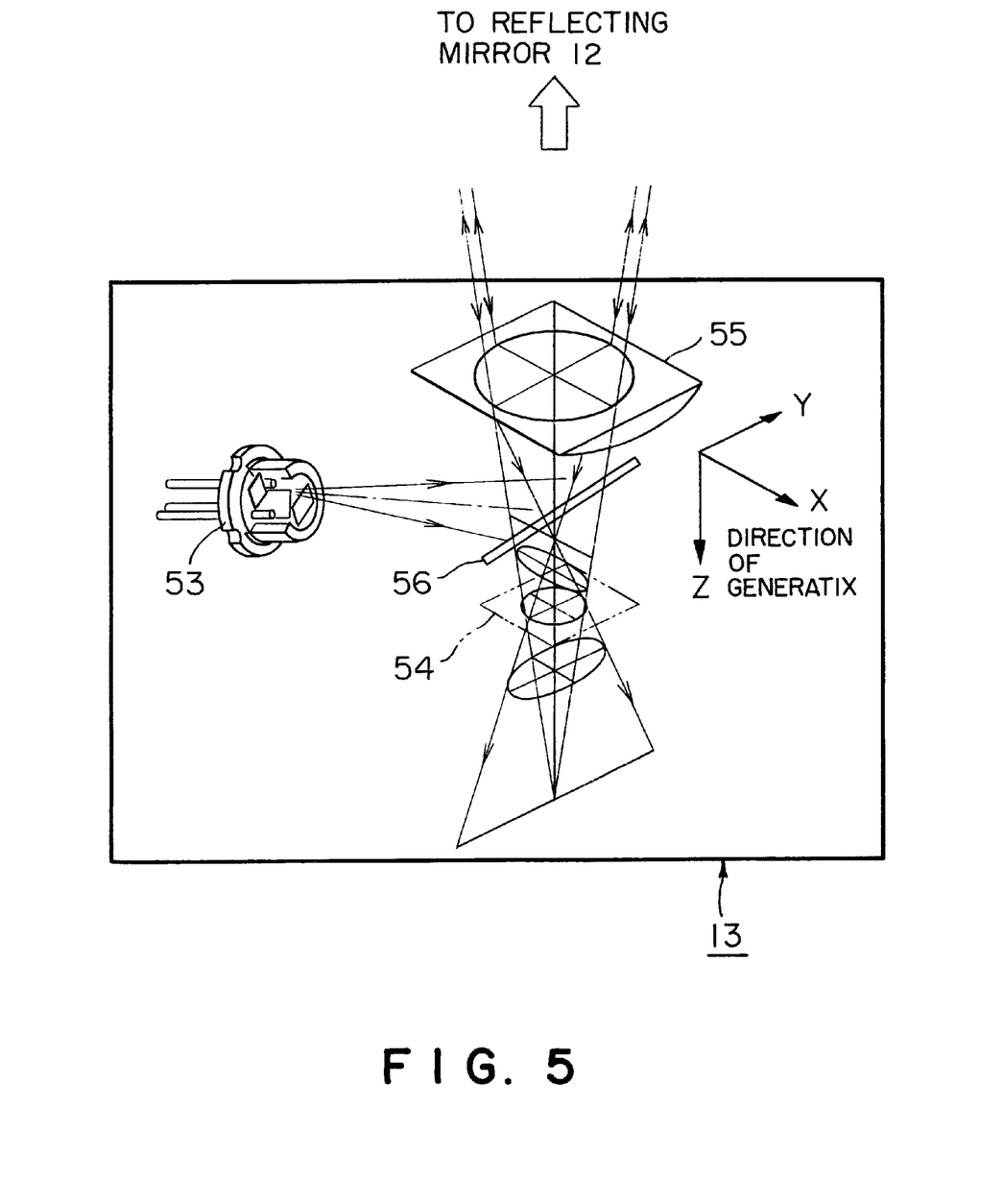
FIG. 5 illustrates another structure of an integrated laser resonating and detecting device.

Not only the device 13 as shown in FIG. 4, another device shown in FIG. 5 that includes a laser source 53, a photodetector 54, a cylindrical lens 55 and a beam splitter 56 can be used as a laser resonating and detecting device for DVDs.

The devices shown in FIGS. 4 and 5 are described for DVDs, however, such device structures can be applied to the laser resonating and detecting device 8 for CDs with a laser wavelength different from that of DVDs.

In FIGS. 2 and 3, the laser resonating and detecting device 13 for DVDs emits a laser beam in a direction horizontal to the disc surface. The laser beam is changed in direction by the reflecting mirror 12 and converted from a beam of diffused light into a beam of parallel light by a collimator lens 11. The laser beam of parallel light is again changed in direction to a vertical direction with respect to the disc surface by the mirror 10. The laser beam in the vertical direction is coaxial with the objective lens 9 for DVDs.

The laser beam emitted by the laser resonating and detecting device 13 for DVDs is once changed its direction by the reflecting mirror 12 as shown in FIG. 2. However, if there is enough space, the laser beam can be directly passed through the collimator lens 11 without the reflecting mirror 12. This is achieved by a structure in that the collimator lens 11 and the laser resonating and detecting device 13 for DVDs are arranged as coaxial with each other.

Further, in FIG. 2, the collimator lens 11 can be placed between the reflecting mirror 12 and the laser resonating and detecting device 13 for DVDs. In this case, the laser beam emitted by the laser resonating and detecting device 13 is converted from a beam of diffused light into a beam of parallel light by the collimator lens 11 and changed in direction by the reflecting mirror 12.

As described above, the minimum structural requirement of the second optical system for DVDs is that a laser beam emitted by the laser resonating and detecting device 13 for DVDs is converted from a beam of diffused light into a beam of parallel light by the collimator lens 11 and guided onto the second objective lens 9 for DVDs.

The first objective lens 6 for CDs and the second objective lens 9 for DVDs are provided with an actuator for focus and tracking control. As shown in FIG. 1, the objective lenses 6 and 9 are integrally fixed on a rectangular bobbin 20. The bobbin 20 is swingably supported in a direction horizontal to the disc surface by elastic wires 21a and 21b (not shown but four wires actually) extended from the pickup base 5.

Provided on both ends of the bobbin 20 are focusing coils 22a and 22b with tracking coils 23a and 23b, respectively. Further, on both ends of the bobbin 20 and close to the focusing and tracking coils, driving magnets 24a and 24b are provided such that they stand up on the pickup base 5.

The bobbin 20 is swung in focus and tracking directions due to interaction of control currents applied to the focusing and tracking coils and magnetic fields of the driving magnets.

As described later in detail, the first and second objective lenses 6 and 9 are not provided in directions vertical to a dashed line L of FIG. 1 passing through a center O of the optical disc 1 but provided such that they are slightly deviated to the center O.

Figure 6:
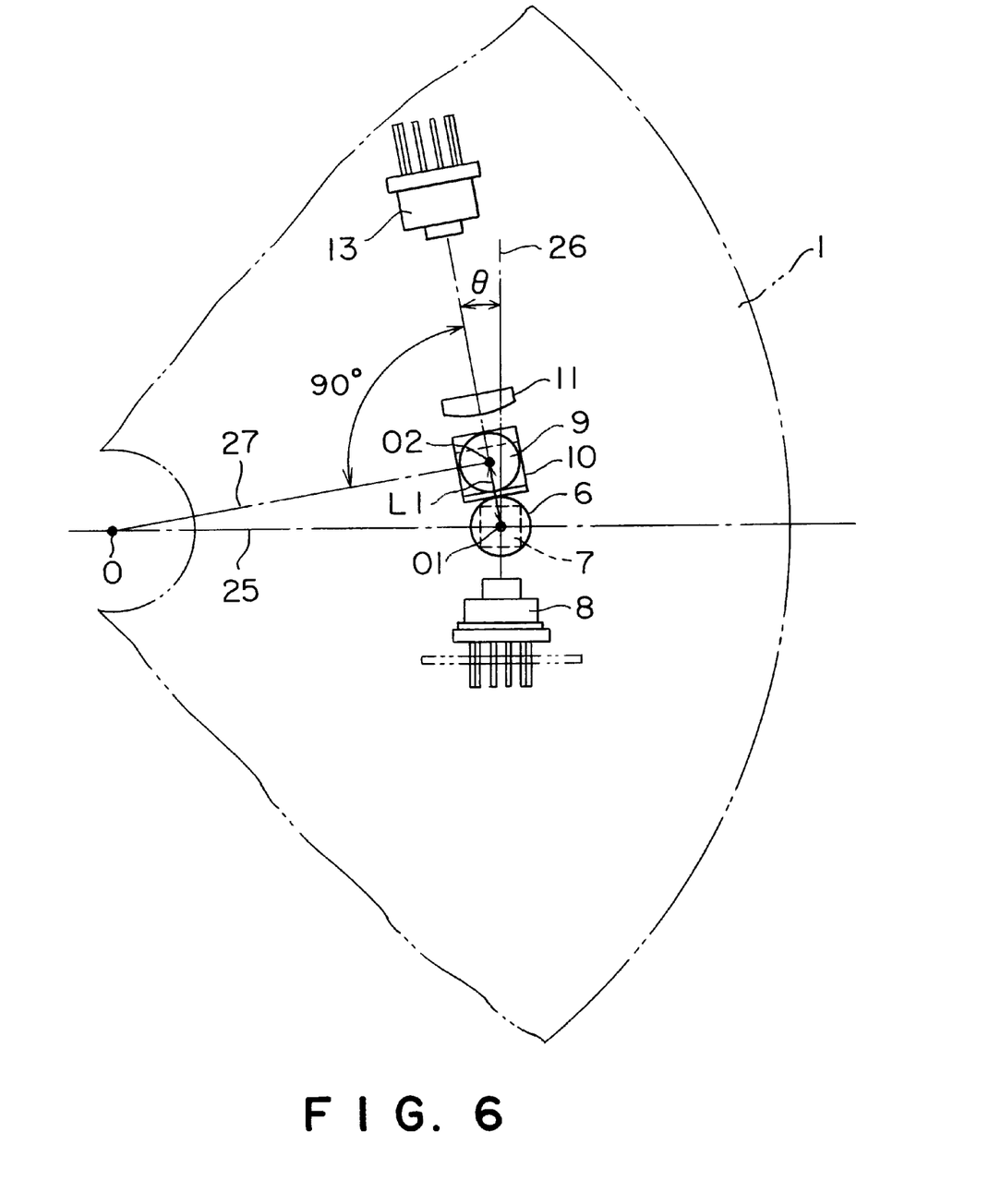
FIG. 6 illustrates the optical positional relationship of the optical devices when an objective lens for DVDs arrives over a middle portion of an optical disc.

Further, as shown in FIG. 6, the first objective lens 6 for CDs is provided such that it moves along a first dashed line 25 connecting its center O1 and the center O of the optical disc 1. This function meets a three beam tracking method employed by the laser resonating and detecting device 8 for CDs.

On the other hand, the second objective lens 9 for DVDs is provided such that it is deviated from the first dashed line 25. Further, the second objective lens 9 is slightly deviated from a second dashed line 26 orthogonal to the first dashed line 25. In detail, the objective lens 9 is slightly inclined to the center O of the optical disc 1 from the second dashed line 26 by an angle θ such as 10 degrees. A distance L1 between the center O1 of the first objective lens 6 for CDs and a center O2 of the second objective lens 9 for DVDs is about 6 mm.

As already described, both the first optical system for CDs and the second optical system for DVDs are provided on the pickup base 5, and will be moved simultaneously in the directions A and A' as shown in FIG. 2, that is a direction of the diameter of the optical disc 1 when a CD or DVD is fed to an optical apparatus shown in FIG. 1.

Not only as shown in FIG. 6, the second objective lens 9 for DVDs can be provided on the other side of the first objective lens 6 for CDs, or a position such that it is symmetrical with the present position of the second objective lens 9 with respect to the first dashed line 25.

Here, FIG. 6 indicates positional relationships of the first objective lens 6 for CDs, the reflecting mirror 7 and the laser emitting and detecting device 8 for CDs, and the second objective lens 9 for DVDs, the collimator lens 11 and the laser resonating and detecting device 13 for DVDs without the reflecting mirror 12 when the second objective lens 9 arrives over almost a middle portion of the optical disc 1.

In FIG. 6, the laser resonating and detecting device 13 for DVDs is provided on a plane parallel to the disc surface and in a direction orthogonal to a third dashed line 27 connecting the center O of the optical disc 1 and the center O2 of the second objective lens 9 for DVDs.

In other words, a direction of the laser beam emitted by the laser resonating and detecting device 13 for DVDs and a direction of a laser beam before entering the device 13 are both orthogonal to the third dashed line 27 when the second objective lens 9 arrives over the middle portion of the optical disc 1. Or, an optical axis of the laser resonating and detecting device 13 for DVDs meets a tangent of a track on the middle portion of the optical disc 1.

Figure 7:
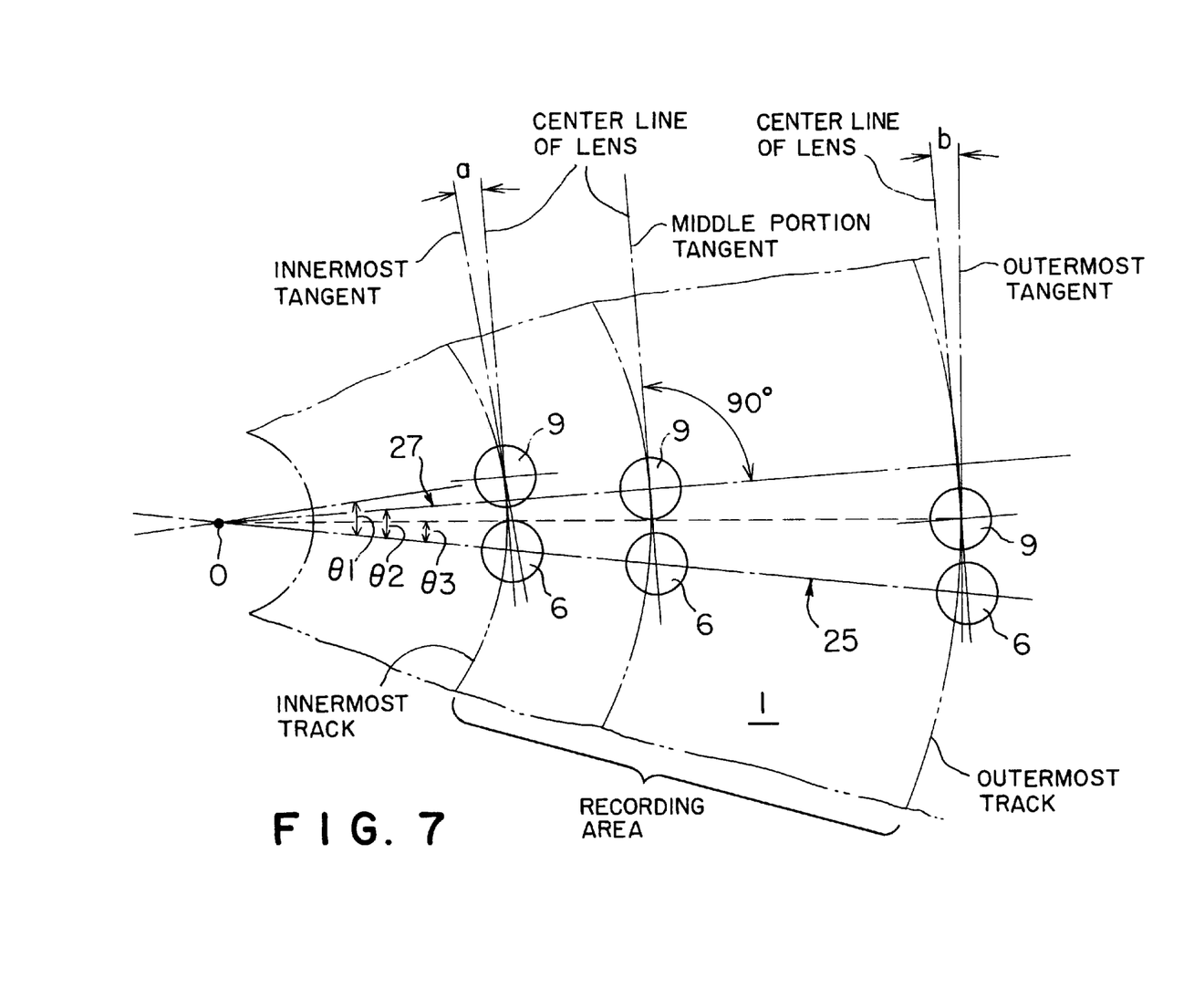
FIG. 7 illustrates the states when objective lenses for CDs and DVDs arrive over a middle portion, and the inner and outer portions of an optical disc.

Here, the middle portion of the optical disc 1 is a portion at which an opening angle from the center O of the optical disc 1 is about one-half when the second objective lens 9 is located over the outermost and innermost tracks of the optical disc 1, that is, one-third close to the innermost tracks on the optical disc 1. In other words, the middle portion of the optical disc 1 is a portion at which opening angles $\theta_1$, $\theta_2$ and $\theta_3$ from the center O of the optical disc 1 in FIG. 7 have the following relationship:

$$\theta_1 + \theta_3 = 2\theta_2$$

If there is no much space for positional relationships shown in FIG. 6, the laser beam emitted by the laser resonating and detecting device 13 for DVDs can be reflected by the reflecting mirror 12 as shown in FIG. 2. In this case, the laser beam reflected by the reflecting mirror 12 will be guided in a direction orthogonal to the third dashed line 27 connecting the center O of the optical disc 1 and the center O2 of the second objective lens 9 for DVDs.

Discussed below with reference to FIGS. 5, 7 and 8A to 8C is the reason for the placement of the laser resonating and detecting device 13 for DVDs on the plane parallel to the disc surface and in the direction orthogonal to the third dashed line 27 when the second objective lens 9 arrives over the middle portion discussed above of the optical disc 1.

FIG. 7 indicates the locations of the first and the second objective lenses 6 and 9 when the second objective lens 9 arrives over the middle portion discussed above, and the innermost and the outermost tracks of the optical disc 1.

Figure 8A:
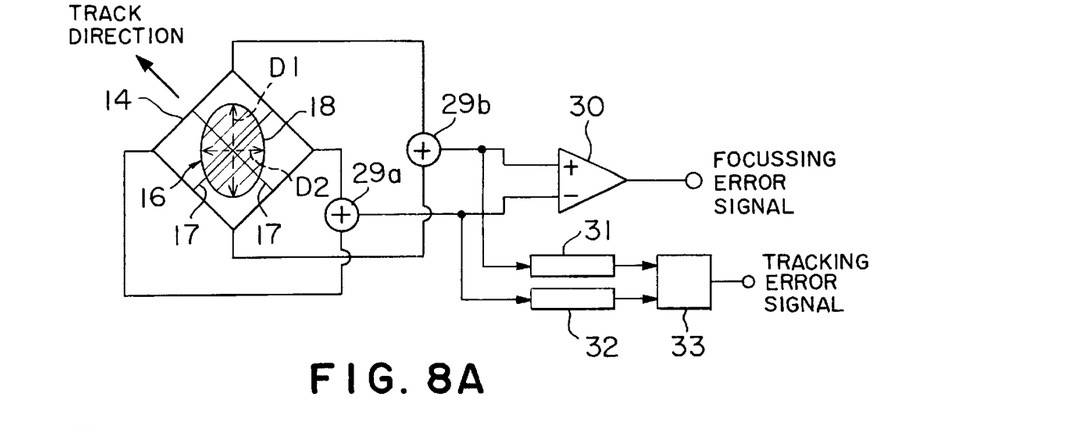
FIGS. 8A, 8B and 8C illustrate images formed on a four-divided photodetector.
Figure 8B:
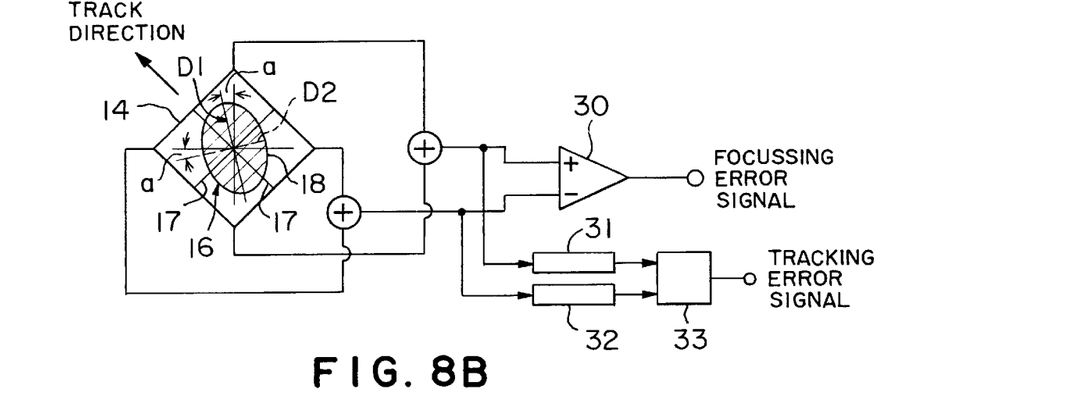
Figure 8C:
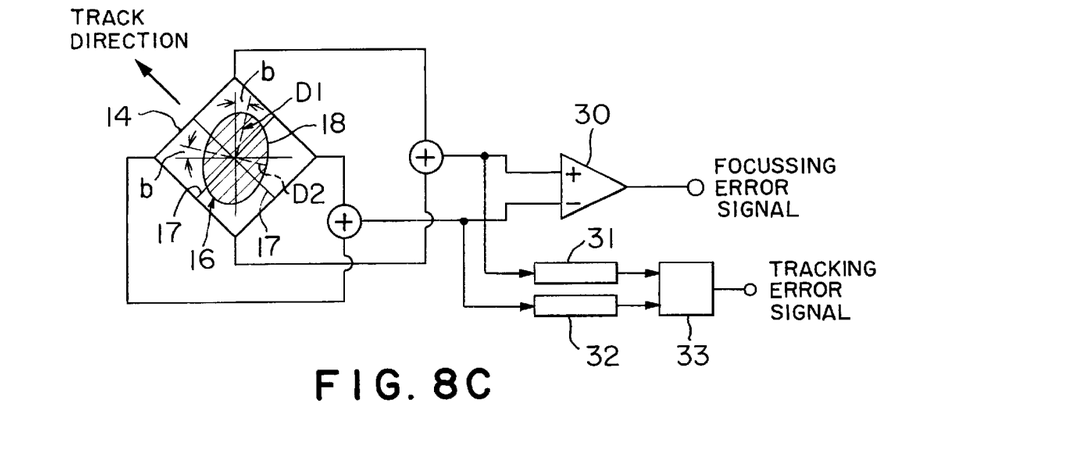

FIGS. 8A to 8C illustrate images formed on a four-divided photodetector 14 when the second objective lens 9 arrives over the middle portion discussed above, and the innermost and the outermost tracks on the optical disc 1, respectively.

The photodetector 14 is located in a plane indicated by a chain-double dashed box 54 in FIG. 5. The laser resonating and detecting device 13 for DVDs employs astigmatism in focussing control and phase-difference in tacking control. One of four lines that divide a photodetecting area into four on the box 54 is almost identical to a track direction.

FIG. 8A illustrates a defocused elliptic image 16 (optical pattern) produced on the four-divided photodetector 14 when the second objective lens 9 for DVDs arrives over the middle portion discussed above of the optical disc 1. The photodetector 14 is adjusted so that the elliptic image 16 has a long diameter D1 and a short diameter D2 both deviated by 45 degrees from four dividing lines 17.

Also shown in FIG. 8A are adders 29*a* and 29*b* each for adding signals produced by two photosensors arranged on an diagonal line of the photodetector 14, an amplifier 30 for producing a focussing error signal by comparing addition signals of the adders 29*a* and 29*b*. Further shown in FIG. 8A are comparators 31 and 32 for comparing the addition signals with a zero level and a phase comparator 33 for comparing the outputs of the comparators 31 and 32 each other to produce a tracking error signal.

When the objective lens 9 arrives over the innermost or the outermost track of the optical disc 1 as shown in FIG. 8B or 8C, the defocused elliptic image 16 produced on the four-divided photodetector 14 as adjusted above exhibits the long and short diameters D1 and D2 both slightly deviated from the 45 degrees by an angle "a" or The deviation shown in FIG. 8B or 8C is caused by the deviation of angle "a" or "b" shown in FIG. 7 between tangents of inner and outer tracks of the optical disc 1 and the optical axis of the laser resonating and detecting device 13 for DVDs.

This implies the deviation such that the image 16 is rotated by the angle "a" or "b" on the four-divided photo-detector 14 when the objective lens 9 arrives over the innermost or the outermost track of the optical disc 1. The angles "a" and "b" are almost equal to each other and a minute angle such as 7 degrees.

Accordingly, the angular deviation of an image produced on the four-divided photodetector 14 as discussed above can be restricted at a minimum degree over the recording area (data area) on the optical disc 1 by installing the laser resonating and detecting device 13 for DVDs in the optical disc apparatus such that the device 13 will be located on a plane parallel to the disc surface in a direction vertical to the third dashed line 27 (FIG. 6) connecting the center O of the optical disc 1 and the center O2 of the second objective lens 9 for DVDs when the objective lens 9 arrives over the middle portion discussed above of the optical disc 1.

In other words, in order to minimize an influence on tracking signals by the angular deviation discussed above, the laser resonating and detecting device 13 for DVDs is installed to meet the following requirements:

The deviation of the second objective lens 9 from the first dashed line 25 connecting the center O1 of the first objective lens 6 and the center O of the optical disc 1 is minimized as much as possible; and the center line of the objective lens 9 meets a track tangent when the objective lens 9 arrives over the middle portion described that is about 30 mm from the center O of the optical disc 1 of 60 mm-radius.

Further, as shown in FIG. 7, the first and second objective lenses 6 and 9 are arranged such that an angle formed by the first dashed line 25 and the third dashed line 27 is 10 degrees ($\theta2$ when the objective lens 9 arrives over the middle portion described above), 15 degrees ($\theta1$ when the objective lens 9 arrives over the innermost track) and 5 degrees ($\theta3$ when the objective lens 9 arrives over the outermost track).

Furthermore, as shown in FIG. 6, the second objective lens 9 is provided such that its center line is deviated to the center O of the optical disc 1 by about 10 degrees as the angle $\theta$ from the second dashed line 26 orthogonal to the first dashed line 25; and the wires 21*a* and 21*b* (actually four wires) of FIG. 1 are provided as deviated with respect to the second dashed line 26 of FIG. 6 so as to adjust the bobbin 20 in a direction of the center O of the optical disc 1 for tracking control.

These structural arrangements achieve tracking control with less time delay and generation of jitter.

Figure 9:
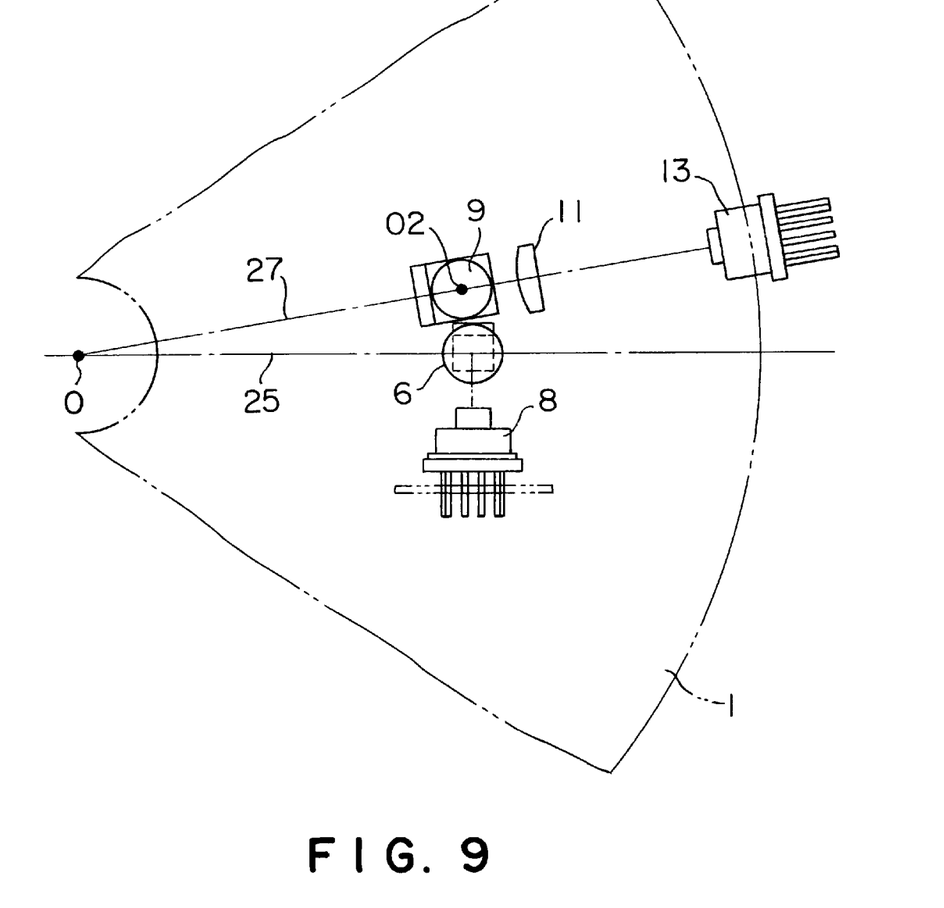
FIG. 9 illustrates the positional relationship of the objective lens for DVDs, laser resonating and detecting device for DVDs, and the objective lens for CDs, laser resonating and detecting device for CDs when the objective lens for DVDs arrives over the middle portion of the optical disc.

The same effect can be achieved as shown in FIG. 9 by installing the laser resonating and detecting device 13 for DVDs in the optical disc apparatus on a plane parallel to the disc surface in a direction horizontal to the third dashed line 27 connecting the center O of the optical disc 1 and the center O2 of the second objective lens 9 for DVDs.

The description made above is the case where the optical disc apparatus is provided with the cylindrical lens 55 shown in FIG. 5.

However, not only this, the same structural arrangement can be applied to the laser resonating and detecting device 13 shown in FIG. 4 with the laser source 50, photodetector 51 and holographic device 52 already described.

A laser beam emitted by the laser resonating and detecting device 13 is guided onto collimator lens 11 via the holographic device 52 and reflecting mirror 12. The laser beam is converted from a beam of diffused light into a beam of parallel light by the collimator lens 11 and guided onto the second objective lens 9 for DVDs as shown in FIG. 2.

A laser beam reflected from the optical disc 1 enters the holographic device 52 of FIG. 4 while being converged by the collimator lens 11 and divided into three bundles of beam in forward and backward tracking directions. The three bundles of beam are supplied to six sensors D1 to D6 of the photodetector 51.

One of the three bundles of beam is detected by the sensors D1 and D3, and D2 and D4 that produce a focussing error signal by a differential computation under Foucault process. The other two bundles of beam are detected by the sensors D5 and D6 to produce a phase difference signal.

Dividing lines 57 of the holographic device 52 are aligned in a tracking direction as shown in FIG. 4. These dividing lines and optical patterns on the holographic device 52 form ±7 degrees in the tracking direction by the same reason already discussed.

Another discussion is made below about how much deviation of the second objective lens 9 for DVDs from the first dashed line 25 connecting the center O1 of the first objective lens 6 and the center O of the optical disc 1 is allowed for giving no harm to tracking signals.

Figure 10:
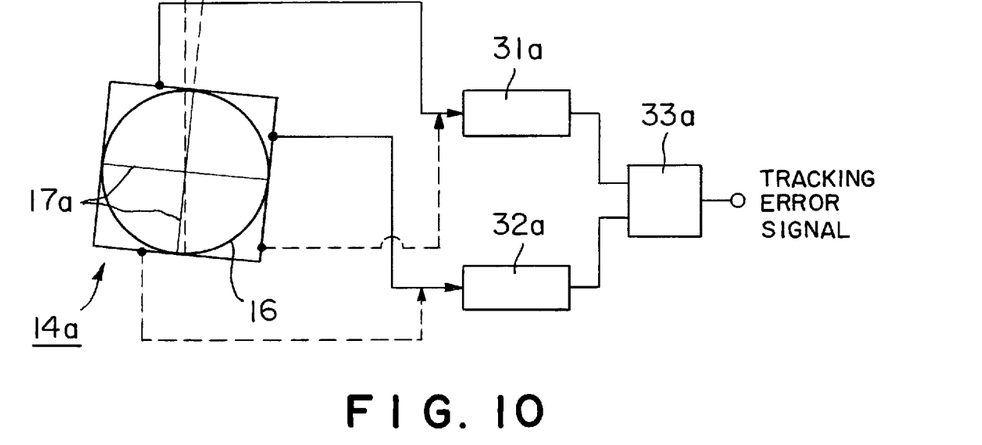
FIG. 10 illustrates an evaluation of allowable deviation of an image formed on the four-divided photodetector.

FIG. 10 illustrates a four-divided photodetector 14a, like the photodetector 14 of FIGS. 8A to 8C, provided with a cylindrical lens (not shown) that acts as a lens in a first direction but not in a second direction orthogonal to the first direction.

The same as described with reference to FIGS. 8A to 8C, a focussing and a tracking error signal are produced on the basis of the outputs of the divided photosensors when a spot (optical) pattern is changed form a circle to an ellipse on the photodetector 14a. A radio frequency signal is obtained as the total of the four photosensors. A generatrix of the cylindrical lens in the second direction in which the cylindrical lens does not act as a lens is set in a direction of 45 degrees with respect to a tracking direction of the optical disc 1.

The four-divided photodetector 14a detects a defocused and thus deformed optical spot for producing a focussing error signal. When a laser beam reflected from the optical disc 1 goes across tracks of pit trains, the reflected laser beam exhibits luminous intensity distribution not uniform on a plane orthogonal to an optical axis on the tracks but changing over a servo band, about less than 30 KHz due to diffraction at the tracks.

The changing luminous intensity distribution components appear symmetrically on the four-divided photodetector 14a with respect to an axis of the photodetector 14a in the tracking direction. The symmetrical components (tracking loss) become common-mode signals in a differential computation for focussing control and thus be canceled. This cancellation technique can be applied not only to the focussing control method as described above using astigmatism but also other focussing control methods.

According to the present invention, the luminous intensity distribution of the reflected laser beam changes when a optical pickup arrives over inner and outer tracks of the optical disc 1 due to the deviation of the second objective lens 9 for DVDs from the radius of the optical disc 1.

In other words, the dividing lines 17a of the four-divided photodetector 14a will meet the track tangent at only one point in the middle portion described above. In detail, as shown in FIG. 7, a center line of the second objective lens 9 will meet the track tangent only when the objective lens 9 arrives over on the middle portion described above. In this respect, FIG. 10 shows that one of the dividing line 17a meets the track tangent when the objective lens 9 arrives over the middle portion described above.

The tracking loss, or the changing luminous intensity distribution components symmetrically appearing on the photodetector 14a with respect to its axis in the tracking direction will exist and contaminate the focussing error signal when the optical axis of the objective lens 9 does not meet the track tangent. The degree of contamination depends on how much angle the optical axis of the objective lens 9 deviates from the track tangent.

Figure 11:
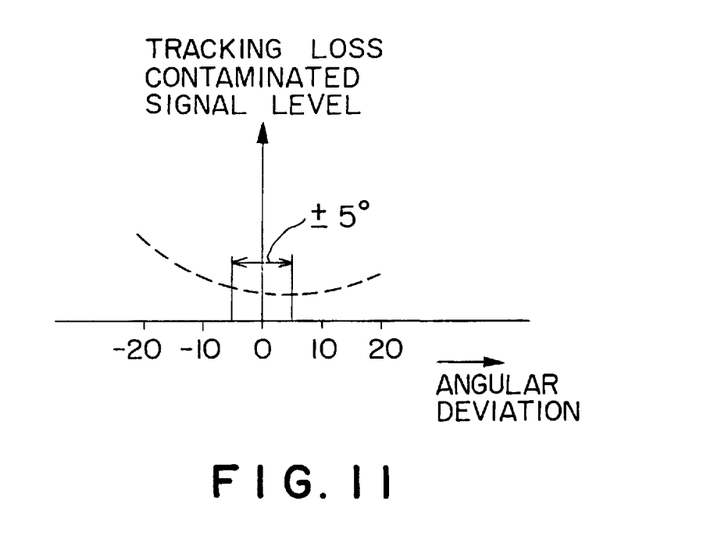
FIG. 11 is a graph showing a relationship between angular deviations and cross track-contaminated signal levels.

FIG. 11 shows the relationship between the angular deviation and the focussing error signal contaminated by the tracking loss components. There is a few tracking loss components even if the angular deviation is zero. The tracking loss components will increase when the angular deviation changes in the range of ±20 degrees. However, the tracking loss components will be less in the range of about ±7 degrees. Particularly, in the range of about ±5 degrees, almost no tracking loss component will contaminate the focussing error signal.

The tracking error signal is produced by detecting change in luminance intensity distribution due to diffraction at the pupil of the objective lens 9 when a spot of laser beam moves over the tracks of pit trains.

More in detail, the tracking error signal is produced by detecting the change by means of the phase difference of diagonal addition outputs of diagonally arranged four photosensors on a photodetector. Or, the tracking error signal is produced by detecting the change by means of the phase difference of outputs of two photosensors adjacent to each other over a tracking direction. The former is called a normal differential phase detection method and the latter a single differential phase detection method. In this respect, FIG. 10 shows a tracking error signal circuit where dashed lines indicate a wiring for the normal phase difference method.

There is also a problem when the dividing lines 17 (FIGS. 8A to 8C) do not meet the track tangent.

Evaluation was made for analyzing this problem in the cases of (1) changing a data-readable radius of an optical disc, (2) changing pit depth within a range limited by signal level and (3) tracking error signal detection by the normal and single phase difference methods. A range of fluctuation of a tracking error signal was within 10% (5% better).

The four-divided photodetector 14 was installed in the optical disc apparatus such that the dividing lines 17 met the track tangent at a radius (the middle portion described above) of the optical disc 1 to reduce fluctuation of a tracking error signal due to change in data-readable radius, the fluctuation range was almost equal on inner and outer tracks and an angular change in inner and outer sides of a certain radius was about 5 degrees.

Figure 12:
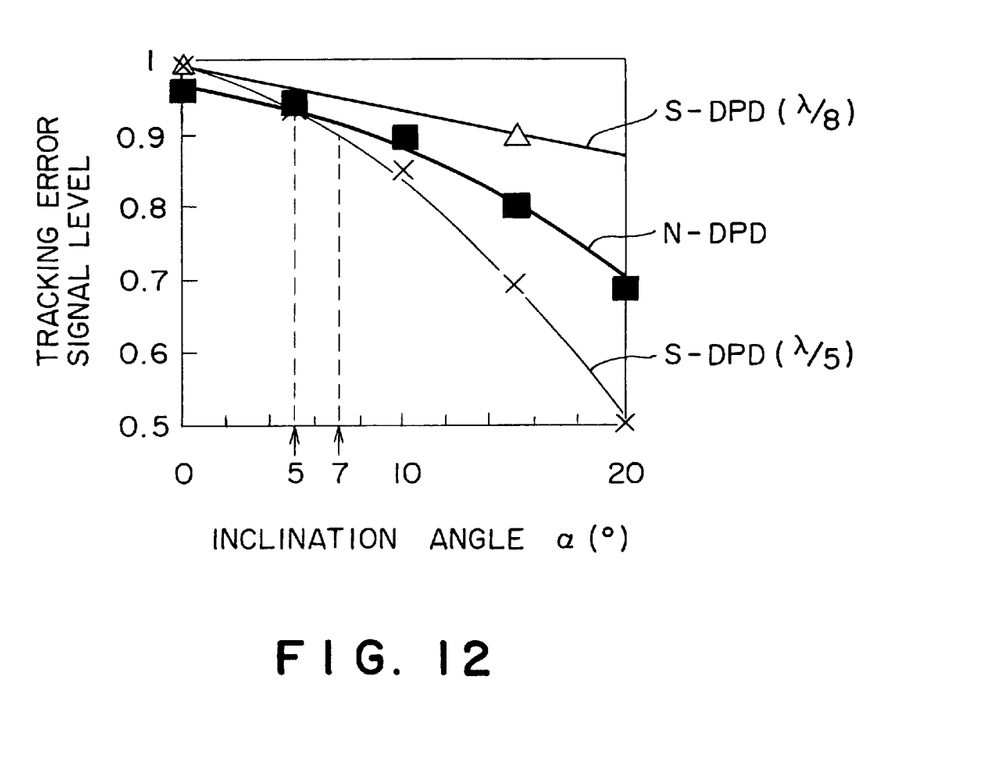
FIG. 12 is a graph showing a relationship between inclination angles of a photodetector and tracking signal levels.

FIG. 12 shows fluctuation of the phase difference tracking error signal level against an inclination angle α the dividing lines 17 of the photodetector 14.

In FIG. 12, a symbol "Δ" indicates the fluctuation of the phase difference tracking error signal level when pit depth is λ/8 under the single differential phase detection method, "■" no fluctuation of the phase difference tracking error signal level due to pit depth under the normal differential phase detection method and "×" the fluctuation of the phase difference tracking error signal level when pit depth is λ/5 under the single differential phase detection method.

As understood from FIG. 12, it is preferable that, in order to restrict the fluctuation of the phase difference tracking error signal level within 10%, the inclination angle a of the dividing lines 17 is within ±7 degrees, particularly, within ±5 degrees for the fluctuation of the signal level within 5%.

Therefore, as already described with reference to FIG. 7, the structural arrangement of the optical disc apparatus is made such that the track tangent and the center line (dividing line 17) of the objective lens 9 meet each other when the objective lens 9 arrives over the middle portion of the optical disc 1 about 30 mm from the center O of the optical disc 1.

It is understood that this structural arrangement achieves angular deviation of the objective lens 9 from the center O being within ±5 degrees even if the objective lens 9 moves from the middle portion to the inner or the outer side with signal modulation capability decided by the DVD standard and no harm to the tracking error signal within a certain range of pit depth.

The installation of the objective lens 9 within the deviation from a disc center as described above thus achieves no harm to the tracking error signal even if the center of the optical disc 1 is fixed with no traversal movement.

Figure 13:
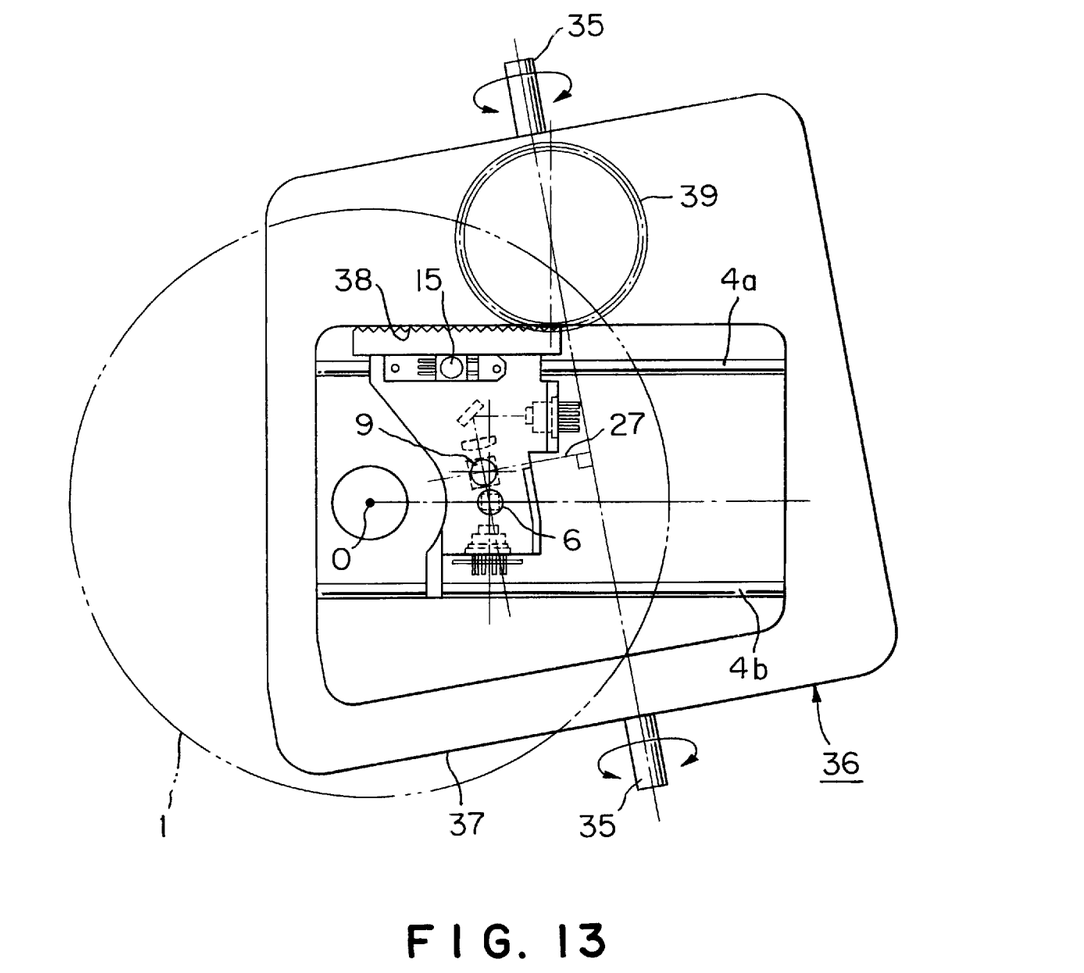
FIG. 13 illustrates a relationship between a deviation rotary shaft of a tilt adjustment mechanism and the objective lens for DVDs.

FIG. 13 illustrates the relationship between the objective lens 9 for DVDs and a tilt rotary shaft 35 of a tilt adjustment mechanism 36.

The optical disc 1 has a narrow track pitch such as 0.74 μm. Hence, if it is deformed, a laser beam focused on the deformed optical disc would diffuse into an ellipse form covering adjacent track portions. This would produce noises that affect data reproduction.

Deviation adjustment is thus required so that the optical axis of the objective lens 9 is always located in a direction vertical to the optical disc surface.

The deviation adjustment mechanism 36 in FIG. 13 is provided with a deviation sensor 15 for detecting the deviation of the objective lens 9. The deviation adjustment mechanism 36 in FIG. 13 is further provided with a rectangular frame-deviation base 37 with the guide shafts 4a and 4b shown in FIGS. 1 and 2. A pinion 39 is provided on the deviation base 37 and is rotatable by a motor (not shown) when engaged with a rack 38 on the pickup base 5. The pinion 39 will be rotated to transfer the pickup base 5 in the disc radius direction.

A deviation rotary shaft 35 is provided on both ends of the deviation base 37 and along the track tangent when the objective lens 9 arrives over the middle portion of the optical disc 1. The deviation rotary shaft 35 is rotated by a motor (not shown).

If the optical disc 1 is deformed like a bowl or a cone, it is the best to rotate the pickup base 5 with respect to a normal of a plane including the line 27 connecting the center O of the optical disc 1 and the center of the objective lens 9 and the center axis of the optical disc 1 when the objective lens 9 arrives over the middle portion of the optical disc 1.

In other words, provision of the deviation rotary shaft 35 on the normal discussed above can make the objective lens 9 for DVDs to follow deformation of the optical disc 1.

The description is made so far for optical discs such as DVDs and CDS of 120 mm-diameter. However, not only limited to these, the present invention is applicable to other optical discs like CDs and mini-discs (MDs) of 80 mm-diameter.

As described above, according to the present invention, a first and a second objective lens for optical discs of different types are provided closely in directions almost orthogonal to the radius of the optical discs with a predetermined distance between the centers of the objective lenses. This structural arrangement provides stable tracking signals without horizontal transfer of the centers of the optical discs.

Further, according to the present invention, a first objective lens for CDs by the three-beam tracking detection method is provided over optical discs and a second objective lens for DVDs by the phase-difference tracking detection method is provided as slightly deviated from a line connecting the centers of the optical discs and that of the first objective lens for CDs. This structural arrangement provides stable tracking control in recording and reproduction for CDs and DVDs.

Further, according to the present invention, the second objective lens for DVDs is provided such that it is deviated to the centers of the optical discs by a minute angle from a line orthogonal to another line in a direction in which a pickup base will move. This structural arrangement restricts jitter that would generate as a crosstalk of a tracking error signal.

Therefore, the optical disc apparatus according to the present invention does not require positional switching mechanism for a spindle motor, and hence achieves compactness and cost-down.

Further, according to the present invention, a rotary shaft of a deviation adjustment mechanism is provided as orthogonal to a line connecting the center of the second objective lens for DVDs and that of the optical discs when the objective lens for DVDs arrives over a middle portion of the optical discs. This structural arrangement provides accurate tracking control in that the optical axis of the objective lens for DVDs is always orthogonal to the disc surface even if a bowl or cone-like deformed optical disc is installed in the optical disc apparatus.

What is claimed is:

1. An optical disc apparatus comprising:
    a first and a second laser resonating and detecting device each emitting a laser beam having a wavelength according to the type of an optical disc and receiving a beam reflected from the optical disc via a first and a second objective lens, respectively, both the first and second objective lenses being mounted on a bobbin; and
    a base on which at least the first and second objective lenses and the first and second laser resonating and detecting devices are mounted, the base being transferable in a direction of the radius of the optical disc, the center of the first objective lens being located for the laser beam to track a first line passing through the center of the optical disc, the first and second objective lenses being switched according to the type of the optical disc without mechanical switching of the objective lenses,
    wherein a center line passing through the centers of the first and second objective lenses is inclined toward the center of. the optical disc by a predetermined angle from a second line that passes through the center of the first objective lens and is orthogonal to the first line so that the center line is deviated from tangents of tracks of the optical disc by plus or minus 7 degrees or less.

2. An optical disc apparatus according to claim 1, wherein the optical disc is a compact disc or a digital versatile disc.

3. An optical disc apparatus comprising:
    a first and a second laser resonating and detecting device each emitting a laser beam having a wavelength according to the type of an optical disc and receiving a beam reflected from the optical disc via a first and a second objective lens, respectively, both the first and second objective lenses being mounted on a bobbin, the second laser resonating and detecting device including at least a photodetector and a light source; and
    a base on which at least the first and second objective lenses and the first and second laser resonating and detecting devices are mounted, the base being transferable in a direction of the radius of the optical disc, the center of the first objective lens being located for the laser beam to track a first line passing through the center of the optical disc, the first and second objective lenses being switched according to the type of the optical disc without mechanical switching of the objective lenses,
    wherein a center line passing through the centers of the first and second objective lenses is inclined toward the center of the optical disc by a predetermined angle from a second line that passes through the center of the first objective lens and is orthogonal to the first line so that at least one splitting line that splits the photodetector is deviated from tangents of tracks of the optical disc by plus or minus 7 degrees or less.

4. An optical disc apparatus according to claim 3, wherein the optical disc is a compact disc or a digital versatile disc.

5. An optical disc apparatus comprising:
    a first and a second laser resonating and detecting device each emitting a laser beam having a wavelength according to the type of an optical disc and receiving a beam reflected from the optical disc via a first and a second objective lens, respectively, both the first and second objective lenses being mounted on a bobbin, the second laser resonating and detecting device including at least a holographic device, a photodetector and a light source; and a base on which at least the first and second objective lenses and the first and second laser resonating and detecting devices are mounted, the base being transferable in a direction of the radius of the optical disc, the center of the first objective lens being located for the laser beam to track a first line passing through the center of the optical disc, the first and second objective lenses being switched according to the type of the optical disc without mechanical switching of the objective lenses, wherein a center line passing through the centers of the first and second objective lenses is inclined toward the center of. the optical disc by a predetermined angle from a second line that passes through the center of the first objective lens and is orthogonal to the first line so that at least one splitting line that splits the holographic device is deviated from tangents of tracks of the optical disc by plus or minus 7 degrees or less.

6. An optical disc apparatus according to claim 5, wherein the optical disc is a compact disc or a digital versatile disc.

* * * * *